Dec. 10, 1957     W. V. BROWN     2,815,665
MEANS FOR DETERMINING AIRCRAFT CHARACTERISTICS
Original Filed Feb. 20, 1947
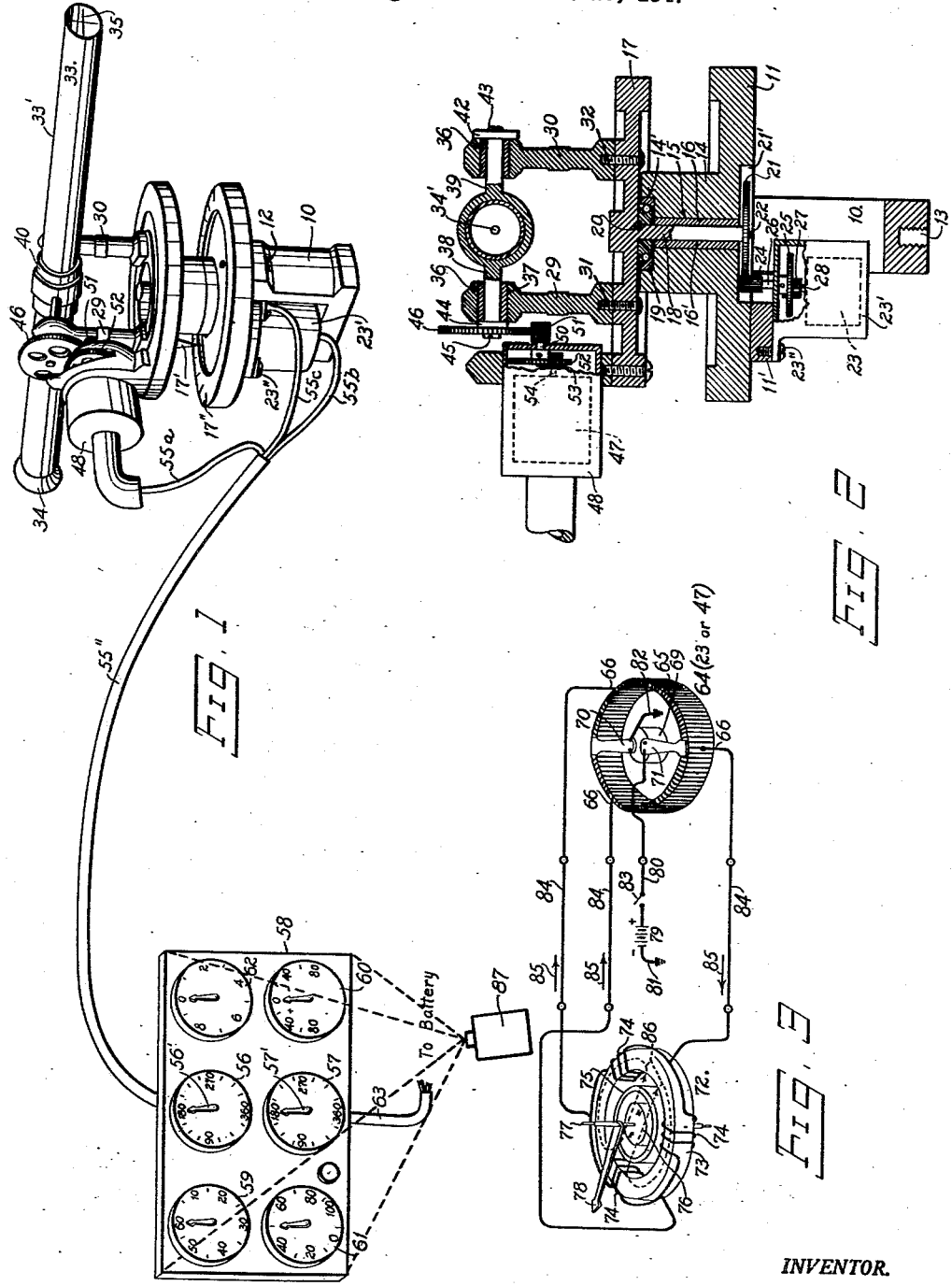
INVENTOR.
William V. Brown
BY *Charles S. Wilson*
ATTORNEY.

United States Patent Office 2,815,665
Patented Dec. 10, 1957

2,815,665

MEANS FOR DETERMINING AIRCRAFT CHARACTERISTICS

William V. Brown, Sands Point, N. Y., assignor to Republic Aviation Corporation, Farmingdale, N. Y., a corporation of Delaware Continuation of application Serial No. 729,895, February 20, 1947. This application April 25, 1955, Serial No. 503,612

1 Claim. (Cl. 73—432)

This is a continuing application of the co-pending application Serial Number 729,895 filed by William V. Brown on February 20, 1947, entitled "Method and Means for Determining Aircraft Characteristics," now abandoned.

This invention relates to an apparatus for recording the performance characteristics of an aircraft during takeoff and landing operations, so that the distance required for the operation, the angle of ascent or descent, the landing speed and other data may be quickly and accurately determined.

For operational purposes it is essential to establish standard landing and take-off characteristics for each aircraft which can be varied, by computation, to take into account changes in or departures from the conditions upon which the standard is predicated. The instant invention proposes an apparatus whereby full and complete data upon which to predicate standard take-off and landing characteristics can be automatically and continuously gathered and recorded by a unitary instrumentality.

Since this invention employs means for recording the movement of the aircraft in terms of angular coordinates, it is possible to obtain simultaneous recordings of other instruments indicating ambient weather conditions, such as barometric pressure, temperature and wind velocity, affecting the flight of the plane. This procedure provides positive correlation between the two sets of data and avoids possibility of errors from the use of weather information observed several miles from the landing strip or even at a time other than that during which the test took place. Although the measurement of weather data per se is not intended to comprise part of the invention, its correlation with the tracking information is facilitated and constitutes part of this invention. This feature is of importance since the takeoff and landing characteristics frequently must be converted or related to a theoretical or arbitrary set of weather conditions in order to be able to determine whether or not the plane meets predetermined performance requirements.

With the above and other objects in view this invention consists of the construction, combination and arrangement of parts all as hereinafter more fully described, claimed and illustrated in the accompanying drawings wherein:

Fig. 1 is a perspective view of the sighting instrument and coordinated instrument panel for tracking or following and remotely indicating the path of an aircraft in flight according to the present invention;

Fig. 2 is a vertical section through the trunnions of the sighting instrument illustrated in Fig. 1 showing the details thereof and especially the means for coordinating the instrument with the instruments of the recording panel; and Fig. 3 is a schematic wiring diagram illustrating the transmission and indication of the horizontal and vertical movements described by the sighting instrument while tracking or following the flight of an aircraft.

It is essential to establish standard take-off and landing characteristics for each airplane, or at least each type of airplane, whereby the pilot can determine whether or not the plane can land on and take-off from any airport or field of known size and altitude. These standards are usually established for several given loads at sea-level on the basis or arbitrary or ideal conditions, or are referred to sea-level when established at points above sea-level on the basis of the same arbitrary or ideal conditions. Once the standard take-off and landing characteristics are established for an aircraft they can, by known computations, be adjusted to conditions surrounding the actual operation. In this computation all factors, such as altitude of the airport or field, temperature, other weather conditions, etc. that normally affect the landing and take-off of aircraft are compensated for.

It has generally been accepted that in relation to the length of a runway or field on take-off or landing the aircraft shall be able to clear an imaginary obstacle of a given heighth (say fifty feet) situated at the end of the runway or field. Hence the salient factors in determining the characteristics of an aircraft are the angle of climb or descent and the length of the run to the point of take-off or the run required after the landing contact, taking into consideration the altitude of the field, the ambient weather conditions, load, etc. With the standard landing and take-off characteristics of an aircraft modified by suitable computations the pilot can always determine whether or not any available airport or field can be used by the particular aircraft he is flying.

Many more or less haphazard means and methods have heretofore been employed to establish the landing and take-off characteristics of aircraft and all have been found to be objectionable, some because of their inaccuracy and others because of the complicated and expensive apparatus and computation they require as well as the extensive trained personnel necessary to their operation.

The instant invention proposes a single sighting or tracking instrument which, by closely following the movement of the aircraft, will automatically transmit to a coordinated set of instruments or indicators all data respecting the aircraft from the beginning of its run until it is airborne and reversely will transmit all data of approach and landing until the aircraft is at rest.

Referring to the drawings, the sighting instrument (Fig. 1) consists of a fixed or stationary base 10 having a normally horizontal, circular base plate 11 secured to the upper side thereof by any suitable means such as the screws 12. A threaded opening 13 in the underside of the base 10 is provided for the attachment of a suitable tripod or other mounting means that will support the instrument substantially at eye level during its use. On the plate 11 is a concentric upwardly extending column 14 formed integrally therewith having a vertical passage 15, extending through both the column and the plate, and containing a bearing 16. A second or upper circular plate 17 having a depending coaxial shaft 18 is positioned on the column 14 with the shaft 18 extending through the passage 16' in the bearing 16. To support the plate 17 for rotation with respect to the column a vertical thrust bearing 19 is positioned in a corresponding recess 14' in the upper end of the column and tightly fitted to the shaft 18 at 20.

The lower end of the shaft 18 projects beyond the bearing 16 and carries a spur gear 21 fastened thereto by any suitable means such as screw 22, the spur gear being contained wholly within a recess 21' in the under side of the plate 11. Rotary motion of the upper plate 17 is therefore transmitted through the shaft 18 to the gear 21 which by means of a gear train causes the corresponding rotation of the shaft 28 of the transmitting element 23. This gear train consists of the spur gear 21, cooperating spur gears 24 and 25 pinned on the countershaft 26, and the spur gear 27 fixed on the transmitter shaft 28. The drive gears 21 and 25 have been made considerably larger in diameter than their cooperating or meshing driven gears 24 and 27 so that a small angular displacement or rotation of the plate 17 will result in a relatively large angular shift of the transmitter armature shaft 28 to improve the accuracy with which angular movement, as defined by rotation of the plate 17, may be measured.

The transmitting element 23 is housed in a suitable protective casing 23' fastened to the underside of plate 11 by screws 23" passing through a mounting flange on the casing 23' and threaded into the block 11' which in turn is welded or otherwise suitably fastened to the base plate 11. In order to provide the operator with means for roughly determining the relative positions of the plates 11 and 17, a pointer 17' is attached to and depends from the plate 17 to cooperate with angular scale 17" on the edge of the plate 11.

Extending upwardly from the plate 17 are two posts 29 and 30 fastened to the plate by screws 31 and 32 which receive and support the trunnions 38 and 39 of the sight 33. This sight consists of a relatively long narrow tube 33', an eye-piece 34 at one of its ends having a small aperture 34' and the crosshairs 35 at its opposite end. Although this sight does not include a lens system for magnifying the object sighted upon, such a system may be included if it is desired or necessary to obtain additional accuracy or vision. Piercing each post 29 and 30 is a transverse passage 36 containing a cylindrical bearing 37 to rotatably receive and support the trunnions 38 and 39, which can be formed integrally with the collar 40 encircling the tube 33' midway between its ends and fixed thereto against longitudinal or rotary movement. On the outer end of the trunnion 39 a washer 42 is held by the screw 43 to prevent transverse movement of the tube 33' in one direction. The opposite trunnion 38, in addition to having a corresponding washer 44 and screw 45, carries a spur gear 46 suitably keyed thereto for rotation with the tube 33' as it is manually moved through a vertical angle. This rotary motion of the spur gear 46 is transmitted to a second transmitting element 47 positioned in the housing 48 fixedly mounted on the upper plate 17 by a bracket 49. Transmission of this rotary motion from the tube 33' is accomplished by a gear train consisting of the gear 46, gears 51 and 52 keyed to the counter shaft 50 supported by the housing 48 and spur gear 53 fixed on the armature shaft 54 of the transmitter 47. Here, as in the case of the horizontal movement of the plate 17, the vertical motion of the sight 33 is amplified so that small angular movements thereof will be recorded by the transmitter 47 as relatively large angular movements.

The vertical and horizontal movements of the sight 33 and the upper plate 17 respectively are converted into corresponding electrical signals by the transmitting elements 23 and 47 which are transmitted through suitable cables 55ª and 55ᵇ, which together with ground cable 55ᶜ are joined to form a single cable 55", to the instruments or indicators 56 and 57 positioned on a control panel 58. These instruments are respectively provided with suitable pointers 56' and 57' adapted to rotate in response to the signals from the transmitting elements 23 and 47 to indicate the precise degree of horizontal and vertical movement of the tube 33'.

In the illustrated form of control panel 58 is also shown a chronometer 59, a temperature indicator or thermometer 60, a wind velocity indicator 61, and an altimeter 62, all of which combine to register weather and geographical information affecting the computation of the standard characteristics of the aircraft. Other instruments that may be deemed necessary or desirable may also be included on this panel as well as indicating elements similar to indicators 56 and 57 should more than one sighting station be used. The lead 63 extending from the bottom of the indicating panel 58 connects with a suitable battery and switch (not shown) to energize the transmitting elements 23 and 47 and their associated indicators 56 and 57 as will be described.

The schematic wiring diagram (Fig. 3) illustrates the operation of a direct current selsyn position indicator of the type employed with this equipment although it is to be understood that other types of direct or alternating current devices may also be used to accomplish the same purpose without departing from the scope of the invention. In this diagram the duplicate transmitting elements 23 and 47 are represented by the element 64 which consists of a toroidal wire wound resistor 65 having three terminals 66 spaced at 120° intervals. A concentrically disposed cylinder 69 within the resistor carries a pair of insulated contact arms 70 and 71 adapted to ride on one edge of and contact the toroidal winding 65. This cylindrical member 69, together with the contact arms 70 and 71, constitutes the armature of the transmitter 64 and is therefore connected to or is a part of the shaft 28 of the transmitter 23 or the shaft 54 of the transmitter 47. The indicating unit 72 (corresponding to the indicator or instrument 56 or 57) consists of a laminated ring 73 of magnetic material having three equally spaced windings 74, a concentric damping cylinder 75 of magnetic material and a polarized rotor 76 carrying the shaft 77 and the pointer 78 which is the pointer 56' of the instrument 56 or the pointer 57' of the instrument 57.

The electrical circuit connecting the transmitter 64 and indicator 72 includes a battery or other source of current 79 connected to contact arm 71 of the transmitter 64 by lead 80, which together with the leads 84 comprises the group of leads denoted 55ª in Fig. 1 in the case of transmitter 47, and 55ᵇ in the case of transmitter 23. The lead 55ᶜ is a common ground from the contact arm of the transmitter to the ground side of the battery in cable 55", and to the other contact arm 70 of the transmitter through the ground connections 81 and 82. An "on-off" switch 83 in series with the lead 80 is used to interrupt the flow of current from the battery when the device is not in use. Three leads 84, forming a section 55 of the cable 55ª or 55ᵇ (as indicated above), connect the terminals 66 of the transmitting element 64 to the leads joining adjacent ends of the windings 74, the windings 74 therefore forming a closed series circuit. For the purpose of clarity, arrows 85 have been used to indicate the flow of current in the leads 84, and arrows and flux lines 86 have been used to denote the character and direction of the field set up in the indicator 72 by reason of the flow of current in the leads 84 as set forth by the arrows 85.

With the switch 83 closed and the armature 69 of the transmitter 64 positioned as shown, current will flow through lead 80 to the contact arm 71, part of the winding 65, the terminal 66 immediately beneath the contactor 71 in its illustrated position and lead 84 to the juncture of the two windings 74 to the rear of pointer 78 as presently shown in Fig. 3. At this point the current will divide equally between the two windings 74, and return to the battery via the two remaining leads 84 and their respective connections 66, through the resistance winding 65 to the contact 70, and through grounds 82 and 81 to the battery 79. This flow of current energizes the two coils 74 shown to the rear of the pointer 78 in Fig. 3 but fails to energize the winding 74 located adjacent or beneath the free end of the pointer 78 because both sides of this latter winding are at the same potential. A magnetic field is therefore set up within and across the laminated ring 73 as indicated by the dotted lines and arrows 86 and passes through the concentric dampening ring 75 and the rotor 76. With the magnetic field set up in this manner the rotor 76 having a north and south pole as shown will rotate and align these poles with the magnetic field and this rotation will be reflected by movement of the pointer 78. Any change in the position of the contact arms 70 and 71 from the position indicated in Fig. 3 will vary the direction and proportion of the current flowing through the leads 84 and consequently change the current flowing through the coils 74 to alter the path of the lines of force through the center of the magnet 76 and cause a corresponding or complementary rotation of the rotor or magnet 76 and the indicating arm 78. Since the pointer 78 corresponds to the pointers 56' and 57' of the instruments or indicators 56 and 57, suitable calibrations can be inscribed on the dials thereof to directly indicate any horizontal or vertical angular movement of the sight 33 during the process of tracking a moving aircraft.

The foregoing description of the circuits and components shown in Fig. 3 may be essential to an understanding of the operation of the illustrated embodiment of this invention. However, since the transmitters 23 and 47 and their circuits are standard equipment purchasable upon the open market they, per se, are no part of the invention and other equipment, either electrical or mechanical, may be substituted therefor without departing from the spirit and scope hereof.

To record the information indicated by the various instruments on the panel 58, it is preferred to do so by suitable photographic means shown schematically in Fig. 1 as a conventional time camera 87, although any method that will provide a substantially continuous correlated recording would be satisfactory. A photographic device that may be used in the accomplishment of these purposes is described in Letters Patent issued to George T. Burrell, deceased, #2,378,182.

In the employment of this equipment either one or two sighting instruments illustrated in Fig. 1 may be used for the purpose of recording the take-off or landing data of an aircraft to be the basis for establishing the characteristics thereof. If one instrument is employed the direction of approach or take-off of the aircraft must be known with respect to the position of the instrument. With the use of two instruments the direction of travel of the aircraft is not necessary since an instrument would be located on each end of a base line of known length and direction and customary survey methods can be applied to determine the absolute position of the aircraft in any desired moment. After the instrument, or instruments, whichever is the case, is positioned the indicating or recording panel of instruments 58 and photographic apparatus for recording the readings of the instruments are placed at some convenient point with the cable 55" connecting the sighting instrument with the indicators 56 and 57 on the panel. The desired weather equipment is then positioned in the vicinity of the instrument and connected with the indicators provided therefor on the panel 58 to complete the installation. The switch 83 is then closed and the sight 33 is oriented and the readings of the instruments are recorded by a preliminary operation of the camera for a few moments to establish arbitrary initial readings on said instruments. Having once oriented the instrument, the switch 83 is maintained closed and the sight is ready to be directed toward and track or follow the movement of the aircraft under test. When the aircraft is ready for the take-off, the sight 33 is aligned with some prominent point on the aircraft and the operation of the photographic apparatus is again started to record all movements of the indicating pointers on the panel 58. As the aircraft proceeds down the landing strip or runway and then becomes airborne, the sight 33 is maintained in continuous alignment with the selected point or part of the aircraft until the test portion of the flight is recorded. The photographic apparatus is then turned off and upon development of the photographic film the precise path of the aircraft as well as the speed, angle of ascent and other desired operating characteristics may be accurately and finally determined and corrected for existing weather conditions. When two instruments are used for tracking in the manner just described, it is preferable that the instrument panels be located at a central point and photographed simultaneously to avoid any possible error in synchronizing the two cameras.

From the foregoing description, it is apparent that with the recorded data, and the various geographical points known, a permanent, correlated set of basic flight and weather information is produced which is always available for review and further computation without entailing duplicate test flights. Furthermore, since the tracking information is presented directly in terms of basic units, namely, deflection and elevation, the difficulties and errors usually experienced in attempting to obtain this data from a photographic record of the actual aircraft are completely eliminated.

What is claimed is:

An apparatus to permanently record on a continuous photographic film basic data establishing standard characteristics of an aircraft in landing and take-off comprising a sighting instrument located at a fixed point of observation substantially normal to and at one side of the path of movement of the aircraft and capable of vertical and horizontal movements in optically tracking the aircraft in taking off or landing, an associated recording station having a panel with independent indicators mounted thereon for visually registering time, geographic elevation and ambient weather conditions at the runway, additional indicators for independently registering the vertical and the horizontal movements of said sighting instrument, a selsyn motor associated with and operating each additional indicator, a pair of selsyn motors associated with the sighting instrument, one responsive to and operated by the horizontal movement of the instrument and the other responsive to and operated by the vertical movement of the instrument, individual and independent connections between each of the selsyn motors associated with the sighting instrument and the corresponding selsyn motor operating said additional indicators, and an automatic camera coacting with said panel for periodically and simultaneously photographing the readings of all of the instruments on the panel whereby a series of individual pictures is made of registrations corresponding to the progressive horizontal and vertical movement of the aircraft together with elapsed time, elevation and ambient weather conditions affecting the operation of the aircraft.

References Cited in the file of this patent

UNITED STATES PATENTS

| | | |
|---|---|---|
| 510,418 | Fiske | Dec. 12, 1893 |
| 1,908,947 | Benjamin | May 16, 1933 |

OTHER REFERENCES

"Principles of Ground-Speed Measurement" which is part III of Report 127 in vol. 7 (1921), pages 591–592 of the Annual Reports of the National Advisory Committee for Aeronautics.